US012303437B1

(12) United States Patent
Love

(10) Patent No.: US 12,303,437 B1
(45) Date of Patent: May 20, 2025

(54) RECLINING WHEELCHAIR

(71) Applicant: Victoria Love, Morrow, GA (US)

(72) Inventor: Victoria Love, Morrow, GA (US)

( * ) Notice: Subject to any disclaimer, the term of this patent is extended or adjusted under 35 U.S.C. 154(b) by 796 days.

(21) Appl. No.: 17/511,962

(22) Filed: Oct. 27, 2021

Related U.S. Application Data

(60) Provisional application No. 63/106,394, filed on Oct. 28, 2020.

(51) Int. Cl.
*A61G 5/00* (2006.01)
*A61G 5/10* (2006.01)
*A61G 7/16* (2006.01)

(52) U.S. Cl.
CPC ........... *A61G 5/006* (2013.01); *A61G 5/1059* (2013.01); *A61G 5/1075* (2013.01); *A61G 5/1091* (2016.11); *A61G 5/1094* (2016.11); *A61G 7/16* (2013.01)

(58) Field of Classification Search
CPC .... A61G 5/006; A61G 5/1094; A61G 5/1091; A61G 5/1059; A61G 5/1075; A61G 7/16
See application file for complete search history.

(56) References Cited

U.S. PATENT DOCUMENTS 3,284,126 A 11/1966 Piazza
4,997,200 A * 3/1991 Earls ...................... A61G 5/006 280/304
5,659,910 A 8/1997 Weiss
6,276,704 B1 8/2001 Suiter
6,409,265 B1 1/2002 Koerlin et al.
8,157,287 B1 * 4/2012 Cleveland .............. A61G 5/006 297/284.3
8,418,786 B2 4/2013 Clapp et al.
8,516,630 B2 * 8/2013 Gugliotti .............. A61G 5/1089 5/613
8,621,691 B1 * 1/2014 Alsaffar ............. A61H 23/0263 5/613
8,950,776 B2 2/2015 Tsukada et al.
9,004,508 B2 * 4/2015 Tsukada ................. A61G 7/165 280/47.4
9,248,066 B2 * 2/2016 Tsukada ................. A61G 7/053
9,775,754 B1 * 10/2017 Al-Nasseri ............. A61G 5/127
10,314,754 B2 * 6/2019 Karwal .................. A61G 7/008
2011/0277242 A1 * 11/2011 Dionne ................ A61G 7/0524 5/613

(Continued)

OTHER PUBLICATIONS

Plush Wheelchair Bed—Fully Tilt and Reclining. Product Listing [online]. © 2021 Healthcare Matters [retrieved on May 8, 2019]. Retrieved from the Internet: <URL: https://www.healthcarematters.com.sg/products/tilt-recline-wheelchair-fr-31tr-draft>.

(Continued)

*Primary Examiner* — Anne Marie M Boehler
*Assistant Examiner* — Michael R Stabley
(74) *Attorney, Agent, or Firm* — Cramer Patent & Design, PLLC.; Aaron R. Cramer

(57) ABSTRACT

A reclining wheelchair comprises a traditionally styled wheelchair that when lowered converts into a padded changing table. A seat section base, a back section base, and a leg section base are movably attached to a storage area that has an opening for allowing access. The distal ends of a pair of side structural elements are attached to a rear structural element that surrounds the storage area.

20 Claims, 4 Drawing Sheets

(56) References Cited

U.S. PATENT DOCUMENTS

| | | | | |
|---|---|---|---|---|
| 2015/0082537 A1* | 3/2015 | Ohta | .................... | A61G 7/0513 5/2.1 |
| 2017/0035633 A1* | 2/2017 | Amin | .................. | A61G 7/1059 |

OTHER PUBLICATIONS

Medline Excel Reclining Wheelchair with Removable Desk-Length Arms and Elevating Leg Rests, 300 lb. Weight Capacity, 16" Width. Product Listing [online]. © 2021 The Betty Mills Company, Inc. [retrieved on May 8, 2019]. Retrieved from the Internet: <URL: https://www.bettymills.com/excel-reclining-wheelchair-with-removable-desk-length-arms-and-elevating-leg-rests-300-lb-weight-capacity-16-width-mds808350>.

FlexTilt Tilt-In-Space Chair By Med-Mizer. Product Listing [online]. © 2002-2021 by MedMart [retrieved on May 8, 2019]. Retrieved from the Internet: <URL: https://medmartonline.com/med-mizer-flextilt-tilt-in-space-chair?utm_source=google_shopping&gclid=CjwKCAjw_MnmBRAoEiwAPRRWWzGUP9URLZI84NDQBsvgJOKO2BlpTQt8dxytMMF8PQDVr7lv7hv9oBoCk00QAvD_BwE>.

* cited by examiner

RECLINING WHEELCHAIR

RELATED APPLICATIONS

The present invention is a continuation of, was first described in, and claims the benefit of U.S. Provisional Application No. 63/106,394 filed Oct. 28, 2020, the entire disclosures of which are incorporated herein by reference.

FIELD OF THE INVENTION

The present invention relates to a wheelchair having features to assist in patient transfer.

BACKGROUND OF THE INVENTION

It is a well-known fact that Americans are becoming more and more overweight each year. Recent studies have indicated that an estimated sixty-five percent (65%) of U.S. adults are either overweight or obese. In a related statistic, back injuries are becoming more and more common for medical personnel as they are required to lift patients of a heavier average weight each year as well. It is estimated that nearly one in two care providers have sustained a back injury while lifting patients to and from a wheelchair and in and out of beds, toilets, chairs, and the like.

Such an injury rate is high because injured or ill patients have no ability to assist in many cases, with all effort being provided by the care provider. This often means more than one care provider is needed, thus taking care away from other patients and driving up the overall cost of medical care. Accordingly, there exists a need for a means by which patient transfer and patient care can be made easier, especially with oversize or overweight patients. The development of the reclining wheelchair fulfills this need.

SUMMARY OF THE INVENTION

The inventor has recognized the aforementioned inherent problems and lack in the art and observed that there is a need for a reclining wheelchair that has, a seat section having a seat section base attached to and supporting a seat section cushion, a back section having a back section base attached to and supporting a back section cushion, a leg section having a leg section base attached to and supporting a leg section cushion, a pair of side structural elements each with a distal end, a pair of rear wheels attached to the pair of side structural elements, a pair of front wheels attached to the pair of side structural elements, a pair of side arms each attached to a respective side structural element for patient support and comfort, a sideboard first section attached to a first end of the sideboard second section and is aligned with the back section, a sideboard second section attached to the side arm support post and is aligned with the seat section, a sideboard third section attached to a second end of the sideboard second section that is generally aligned with the leg section, a pair of push handle sections having a first end curved rearward and configured to receive a hand of user to aid in manual propulsion of the reclining wheelchair, a pair of center handle sections having a first end and a second end that are attached to opposing side walls of the seat section, and a pair of base handle sections having a first end and a second end which are curved forwardly, wherein the sideboard first section.

The seat section base, the back section base, and the leg section base are movably attached to a storage area that has an opening for allowing access thereto. The distal ends of the pair of side structural elements are attached to a rear structural element that surrounds the storage area. The first ends of the center handle sections are adjustably attached to the respective second end of the push handle section with a joint. The pair of base handle sections are attached to opposing side walls of the leg section. The first ends of the base handle sections are adjustably attached to the respective second end of the center handle section. The sideboard second section, and the sideboard third section are each stored in a sideboard storage area under the seat surface.

The seat section may be supported by at least four seat surface height adjustment mechanisms. The back section may be supported by at least four back surface height adjustment mechanisms. The leg section may be supported by at least four leg surface height adjustment mechanisms. The distal ends of the pair of side structural elements may be integral with the rear structural element that surrounds the storage area. The pair of rear wheels may be attached to the pair of side structural elements via a rear wheel post. The pair of rear wheels may be attached to the rear structural element. The pair of rear wheels may be attached to the rear structural element via the rear wheel post. The pair of rear wheels may be equipped with a locking mechanism to prevent movement. The pair of front wheels may be attached to the pair of side structural elements via a front wheel post. The pair of front wheels may be attached to the front structural element via the front wheel post. The pair of front wheels may be attached to the front structural element. The pair of front wheels may be equipped with a locking mechanism to prevent movement. The pair of rear wheels may be larger than the pair of front wheels. The pair of side arms may each be attached to a respective side structural element with a side arm support post. The sideboard first section may be attached to a first end of the sideboard second section and may be generally aligned with the back section. The sideboard first section, the sideboard second section, and the sideboard third section may each be attached to a side arm support post. The joint may be a corrugated section of similar material of the respective handle sections. The joint may be a living hinge. The reclining wheelchair may convert from a seat configuration to a flatbed configuration adapted to aid in user transfer and user care.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
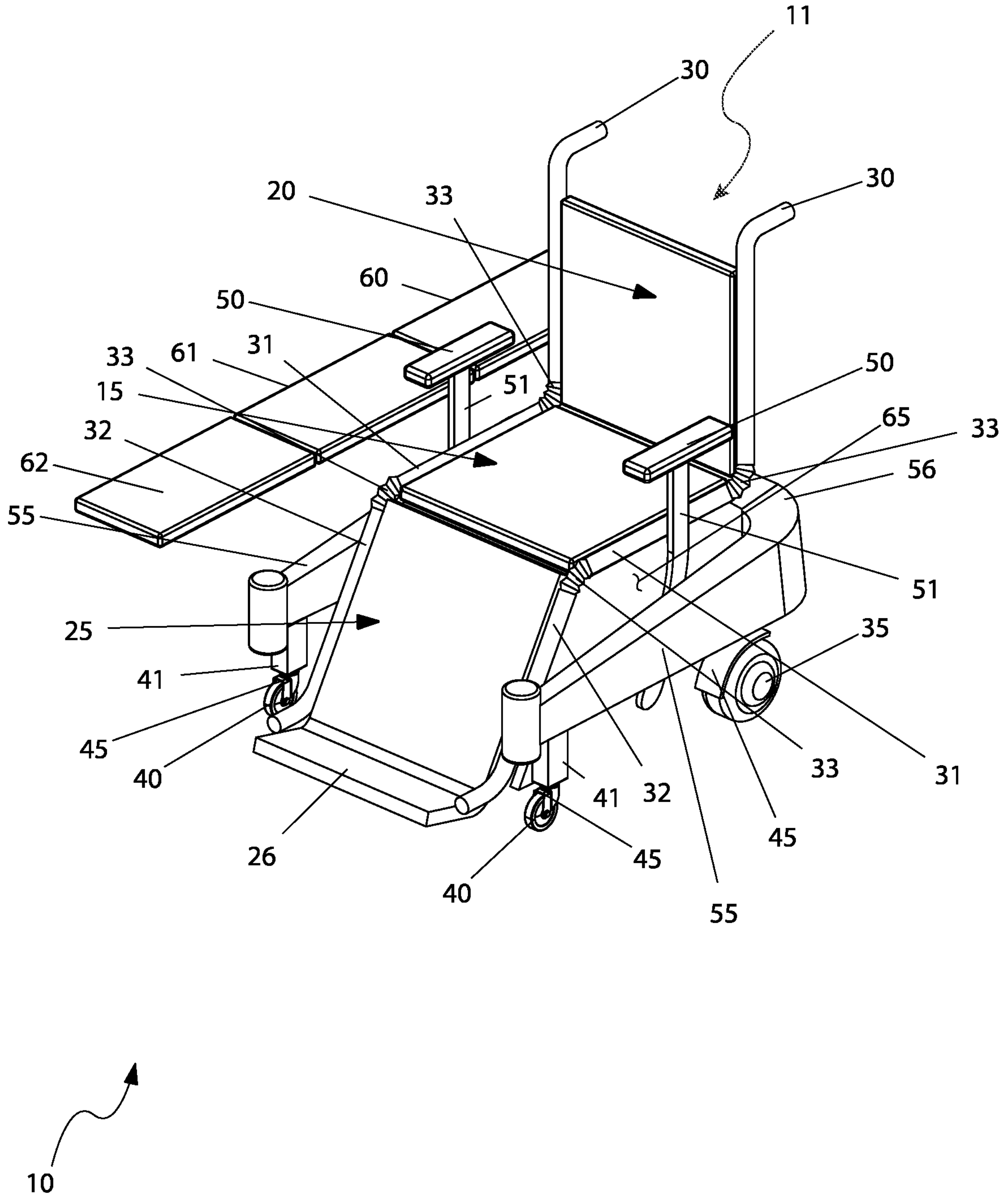
FIG. 1 is a perspective view of a reclining wheelchair, shown in a chair configuration, according to the preferred embodiment of the present invention.

10 reclining wheelchair
11 chair configuration

12 bed configuration
15 seat section
18 seat section base
19 seat section cushion
20 back section
23 back section base
24 back section cushion
25 leg section
26 foot surface
28 leg section base
29 leg section cushion
30 push handle section
31 center handle section
32 base handle section
33 joint
35 rear wheel
36 rear wheel post
40 front wheel
41 front wheel post
45 locking mechanism
50 side arm
51 side arm support post
55 side structural element
56 rear structural element
60 sideboard first section
61 sideboard second section
62 sideboard third section
65 storage area
70 leg surface height adjustment mechanism
75 back surface height adjustment mechanism
80 seat surface height adjustment mechanism
85 height adjustment travel path "h"
90 leg section angle adjustment mechanism
95 leg angle travel adjustment path "l"
100 back section angle adjustment mechanism
105 back angle travel adjustment path "b"
110 rechargeable battery
115 charge controller
120 main controller
125 RF controller
130 remote
135 RF signal

1. Description of the Invention

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a perspective view of the reclining wheelchair 10, shown in a chair configuration 11, according to the preferred embodiment of the present invention is disclosed. The reclining wheelchair (herein also described as the "wheelchair") 10, has an adjustable body bearing surfaces with respect to surface height and surface angle. As such, it converts from a seat configuration 11 to a flatbed configuration 12 to aid in user transfer and user care. The invention provides for a seat section 15, a back section 20 and a leg section 25 as would be found on a conventional wheelchair capable of manual propulsion. The leg section 25 may further include a curving leg section 26 at a bottom side thereof.

The seat section 15 includes a seat section base 18 attached to and supporting a seat section cushion 19. Similarly, the back section 20 includes a back section base 23 attached to and supporting a back section cushion 24 and the leg section 25 includes a leg section base 28 attached to and supporting a leg section cushion 29. The seat section base 18, back section base 23, and leg section base 33 are movably attached to a storage area 65 that has an opening for allowing access thereto. A generally U-shaped frame, comprising a pair of side structural elements 55, each having distal ends attached to or integral with a rear structural element 56 surrounds the sides and rear lower section of the storage area 65.

The wheelchair 10 is capable of traversing the ground on two (2) large rear wheels 35 (only one (1) of which is shown due to illustrative limitations; each attached to the under surface of a rear location of the side structural elements 55 or the rear structural element 56 via a rear wheel post 36) and two (2) slightly smaller front wheels 40 (each attached to the under surface of a fore location of the side structural elements 55 via a front wheel post 41). Each of the rear wheels 35 and front wheels 40 are equipped with a locking mechanism 45 (located within the rear wheel post 36 for the rear wheels 35 and located within the front wheel post 41 of the front wheels 40) to prevent movement during patient transfer operations. Two (2) side arms 50 are provided for patient support and comfort and are each attached to a respective side structural element 55 (or alternately on the side surface of the storage area 65) with a side arm support post 51.

A plurality of sideboard elements 60, 61, 62, here shown on the right of the wheelchair 10, but can be used on the left side as well, are attached to, or attachable to, a side arm support post 51. A sideboard second section 61 is attached to or attachable to the side arm support post 51 and is generally aligned with the seat section 15. The sideboard first section 60 is attached to a first end of the sideboard second section 61 and is generally aligned with the back section 20. The sideboard third section 62 is attached to a second end of the sideboard second section 61 and is generally aligned with the leg section 25. Under use in a chair configuration 11 as shown in FIG. 1, the sideboard elements 60, 61, 62 is usually stored in a sideboard storage area 65 under the seat surface 15 and is only shown on the left side of the wheelchair 10 for illustrative purposes.

A pair of push handle sections 30 has a first end curved rearward and configured to receive a hand of user to aid in manual propulsion of the wheelchair 20, 20. A pair of center handle sections 31 has a first end and a second end and are attached to opposing side walls of the seat section 15. A pair of base handle sections 32 has a first end and a second end which is curved forwardly. The pair of base handle sections 32 and are attached to opposing side walls of the leg section 25. The first ends of the center handle sections 31 are adjustably attached to the respective second end of the push handle section 30 with a joint 33. Similarly, the first ends of the base handle sections 32 are adjustably attached to the respective second end of the center handle section 31 with a similar or identical joint 33. In certain embodiments, the joint 33 is a corrugated section of similar material of the respective handle sections 30, 31, 32, or a living hinge. In other embodiments, the handle sections 30, 31, 32, may be a unitary construction comprising a flexible structural element.

Figure 2:
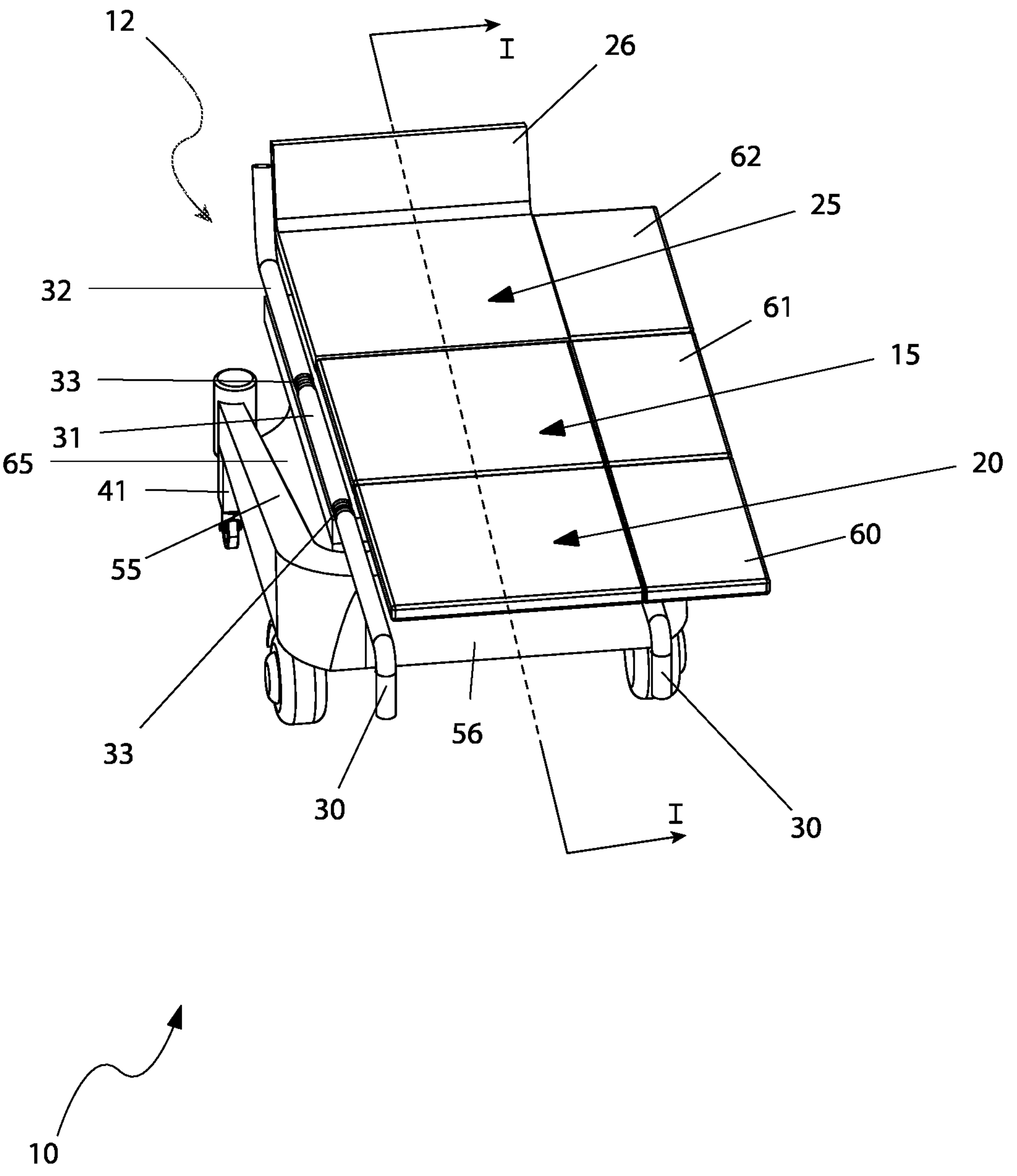
FIG. 2 is a perspective view of the reclining wheelchair, shown in a bed configuration, according to the preferred embodiment of the present invention.

Referring next to FIG. 2, a perspective view of the wheelchair 10, shown in a bed configuration 12, according to the preferred embodiment of the present invention is depicted. The back surface 20 is pivoted to a horizontal position and the leg surface 25 is pivoted to a horizontal position, while the seat surface 15 remains in a horizontal position. The sideboard elements 60, 61, 62 remain attached to the side arm support post 51 on the patient's right side, although it can also be easily placed on the left side depending on which side of the wheelchair 10 the patient is transferring to or from. The side arms 50 (as shown in in FIG. 1) have been removed. The push handle section 30, center handle section 31, and base handle section 32 are cooperatively motioned with the back section 20 and leg section 25 as aforementioned and may also be used to move and position the wheelchair 10 as needed.

Figure 3:
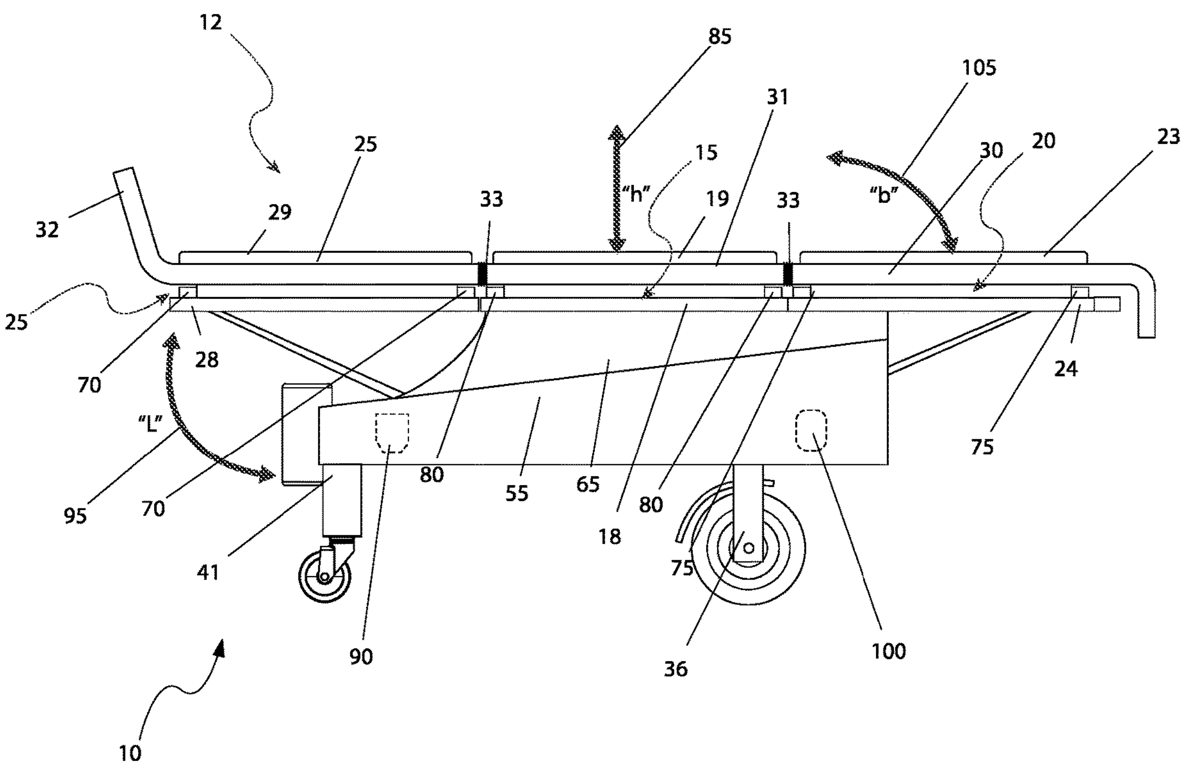
FIG. 3 is a sectional view of the reclining wheelchair, as seen along a Line I-I, as shown in FIG. 2, according to the preferred embodiment of the present invention.

Referring now to FIG. 3, a sectional view of the wheelchair 10, as seen along a Line I-I, as shown in FIG. 2, according to the preferred embodiment of the present invention is shown. The leg section 25 is supported by at least four (4) leg surface height adjustment mechanisms 70 (of which only two (2) are shown due to illustrative limitations) to the upper surface of the storage area 65. The leg surface height adjustment mechanisms 70 can either function to operably move the leg section cushion 24 relative to the leg section base 23 (as is illustrated herein), or alternately operably move the entire leg section 25 relative to the storage area 65 and side and rear structural elements 55, 56. The back section 20 is supported by at least four (4) back surface height adjustment mechanisms 75 (of which only two (2) are shown due to illustrative limitations) to the upper surface of the storage area 65. The back surface height adjustment mechanisms 75 can either function to operably move the back section cushion 29 relative to the back section base 28 (as is illustrated herein), or alternately operably move the entire back section 20 relative to the storage area 65 and side and rear structural elements 55, 56. The seat section 15 is supported by at least four (4) seat surface height adjustment mechanisms 80 (of which only two (2) are shown due to illustrative limitations), also to the upper surface of the storage area 65. The seat surface height adjustment mechanisms 85 can either function to operably move the seat section cushion 19 relative to the seat section base 18 (as is illustrated herein), or alternately operably move the entire seat section 15 relative to the storage area 65 and side and rear structural elements 55, 56.

When working in a synchronized manner, the leg surface height adjustment mechanisms 70, the back surface height adjustment mechanisms 75 and the seat surface height adjustment mechanisms 80 motions the leg section 25, the back section 20, and the seat section 15 along a height adjustment travel path "h" 85, relative to the storage area 65, to facilitate transfer in and out of a bed, motor vehicle, a sofa, a bathtub, a medical device, and the like. At least two (2) leg section angle adjustment mechanisms 90 (of which only one (1) is shown due to illustrative limitations) adjusts the leg section 25 from a horizontal position (as shown) to a more vertical position (as shown in FIG. 1) along a leg angle travel adjustment path "1" 95. At least two (2) back section angle adjustment mechanisms 100 (of which only one (1) is shown due to illustrative limitations) adjusts the back section 20 from a horizontal position (as shown) to a more vertical position (as shown in FIG. 1) along a back-angle travel adjustment path "b" 105. The storage area 65 is shown within the side structural elements 55 and rear structural element 56.

Figure 4:
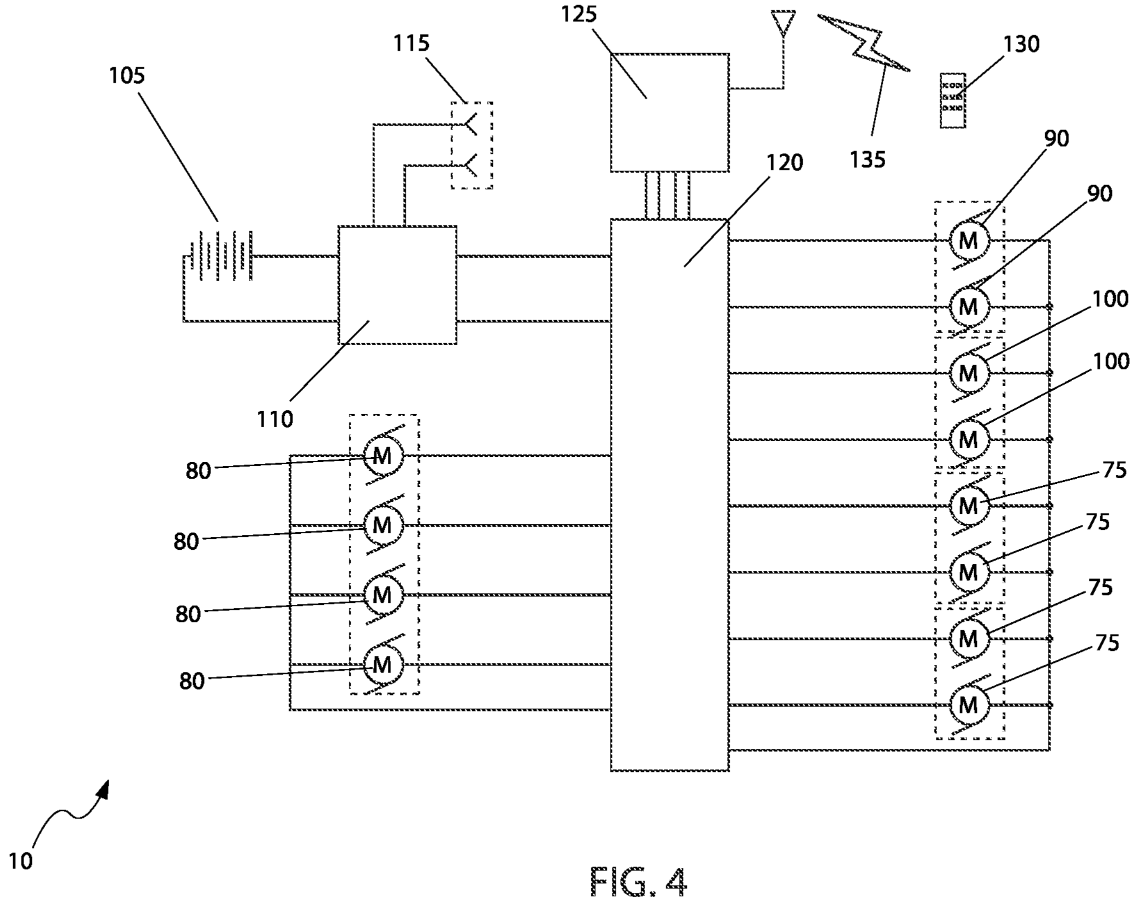
FIG. 4 is an electrical block diagram of the reclining wheelchair, according to the preferred embodiment of the present invention.

Referring to FIG. 4, an electrical block diagram of the reclining wheelchair 10, according to the preferred embodiment of the present invention is disclosed. A back-angle travel adjustment path "b" 105 is charged via a rechargeable battery 110. The rechargeable battery 110 is provided power via a charge controller 115. Resultant power is then delivered to a main controller 120. An RF controller 125 then communicates with a remote 130 via a RF signal 135 to provide input signals to the main controller 120. Outputs from the main controller 120 then controls the four (4) leg surface height adjustment mechanisms 70, the four (4) back surface height adjustment mechanisms 75, the four (4) seat surface height adjustment mechanisms 80, the two (2) leg section angle adjustment mechanisms 90, and the two (2) back section angle adjustment mechanisms 100.

3. Operation of the Preferred Embodiment

The preferred embodiment of the present invention can be utilized by the common user in a simple and effortless manner with little or no training. It is envisioned that the wheelchair 10 would be constructed in general accordance with FIG. 1 through FIG. 4. The user would procure the wheelchair 10 from conventional procurement channels such as home health care supply houses, medical supply houses, mail order and internet supply houses and the like.

After procurement and prior to utilization, the wheelchair 10 would be prepared in the following manner: the back angle travel adjustment path "b" 105 would be charged via the rechargeable battery 110; the sideboard elements 60, 61, 62 would be stowed in the sideboard storage area 65; and the remote 130 would be manipulated to place the leg section angle adjustment mechanisms 90 in a chair position as shown in FIG. 1. The side arm support posts 51 (with or without the side arms 50 attached thereto) can be attached to a respective side structural element 55 (or alternately on the side surface of the storage area 65). At this point in time, the wheelchair 10 is positioned in the chair configuration 11 and can be used as a conventional wheelchair. Also, the side arm support post 51 with the attached (or attachable) sideboard elements 60, 61, 62, can be similarly installed if desired.

During transitioning of the wheelchair 10 from the chair configuration 11 as shown in FIG. 1 to a bed configuration 12 of the FIG. 2, the following procedure would be utilized; the remote 130 would be manipulated to energize the leg section angle adjustment mechanisms 90 and the back section angle adjustment mechanisms 100 to place the leg section 25 and the back section 20 into the same horizontal plane of the seat section 15; the side board elements 60, 61, 62 are removed from the storage area 65 and installed on either the right or left side of the wheelchair 10 via the side arm support post 51 depending on side of the patient transfer; the wheelchair 10 is then raised or lowered using the remote 130 to adjust the back section 20, seat section 15, and leg section 25 along the height adjustment travel path "h" 85; and the patient is then slide or rolled onto the other surface with a minimum of effort on the part of the patient and the care provider. As before, the side arm support posts 51 (with or without the side arms 50 attached thereto) can be attached to a respective side structural element 55 (or alternately on the side surface of the storage area 65).

After use of the reclining wheelchair 10, it may be left in the bed configuration 12 of FIG. 2 or transitioned back to a chair configuration 11 of FIG. 1.

The use of the wheelchair 10 provides the following benefits: easy transfer to or from the wheelchair 10; increased ease of personal care; reduced physical effort when patient is obese on both the part of the patient and the care provider; and a higher level of medical care for children, the elderly, and those with special needs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A reclining wheelchair, comprising:

a seat section having a seat section base attached to and supporting a seat section cushion;

a back section having a back section base attached to and supporting a back section cushion;

a leg section having a leg section base attached to and supporting a leg section cushion, the seat section base, the back section base, and the leg section base are movably attached to a storage area that has an opening for allowing access thereto;

a pair of side structural elements each with a distal end, the distal ends of the pair of side structural elements are attached to a rear structural element that surrounds the storage area;

a pair of rear wheels attached to the pair of side structural elements;

a pair of front wheels attached to the pair of side structural elements;

a pair of side arms each attached to a respective side structural element for patient support and comfort;

a sideboard first section attached to a first end of a sideboard second section and is aligned with the back section when the wheelchair is reclined;

the sideboard second section is attached to the side arm support post and is aligned with the seat section;

a sideboard third section attached to a second end of the sideboard second section and aligned with the leg section when the wheelchair is reclined;

a pair of push handle sections having a first end curved rearward and configured to receive a hand of user to aid in manual propulsion of the reclining wheelchair;

a pair of center handle sections having a first end and a second end that are attached to opposing side walls of the seat section, the first ends of the center handle sections are adjustably attached to the respective second end of the push handle section with a joint; and a pair of base handle sections having a first end and a second end which are curved forwardly, the pair of base handle sections are attached to opposing side walls of the leg section, the first ends of the base handle sections are adjustably attached to the respective second end of the center handle section;

wherein the sideboard first section, the sideboard second section, and the sideboard third section are each stored in a sideboard storage area under the seat surface.

2. The reclining wheelchair according to claim 1, wherein the seat section is supported by at least four seat surface height adjustment mechanisms.

3. The reclining wheelchair according to claim 1, wherein the back section is supported by at least four back surface height adjustment mechanisms.

4. The reclining wheelchair according to claim 1, wherein the leg section is supported by at least four leg surface height adjustment mechanisms.

5. The reclining wheelchair according to claim 1, wherein the distal ends of the pair of side structural elements are integral with the rear structural element that surrounds the storage area.

6. The reclining wheelchair according to claim 1, wherein the pair of rear wheels are attached to the pair of side structural elements via a rear wheel post.

7. The reclining wheelchair according to claim 1, wherein the pair of rear wheels attached to the rear structural element.

8. The reclining wheelchair according to claim 1, wherein the pair of rear wheels are attached to the rear structural element via the rear wheel post.

9. The reclining wheelchair according to claim 1, wherein the pair of rear wheels are equipped with a locking mechanism to prevent movement.

10. The reclining wheelchair according to claim 1, wherein the pair of front wheels are attached to the pair of side structural elements via a front wheel post.

11. The reclining wheelchair according to claim 10, wherein the pair of front wheels are attached to the front structural element via the front wheel post.

12. The reclining wheelchair according to claim 1, wherein the pair of front wheels are attached to the front structural element.

13. The reclining wheelchair according to claim 1, wherein the pair of front wheels are equipped with a locking mechanism to prevent movement.

14. The reclining wheelchair according to claim 1, wherein the pair of rear wheels is larger than the pair of front wheels.

15. The reclining wheelchair according to claim 1, wherein the pair of side arms are each attached to a respective side structural element with a side arm support post.

16. The reclining wheelchair according to claim 1, wherein the sideboard first section is attached to a first end of the sideboard second section and is generally aligned with the back section.

17. The reclining wheelchair according to claim 1, wherein the sideboard first section, the sideboard second section, and the sideboard third section are each attached to a side arm support post.

18. The reclining wheelchair according to claim 1, wherein the joint is a corrugated section of similar material of the respective handle sections.

19. The reclining wheelchair according to claim 1, wherein the joint is a living hinge.

20. The reclining wheelchair according to claim 1, wherein the reclining wheelchair converts from a seat configuration to a flatbed configuration adapted to aid in user transfer and user care.

* * * * *